United States Patent

[11] 3,569,660

| [72] | Inventor | Peter T. Houldcroft<br>Royston, England |
|---|---|---|
| [21] | Appl. No. | 748,418 |
| [22] | Filed | July 29, 1968 |
| [45] | Patented | Mar. 9, 1971 |
| [73] | Assignee | National Research Development<br>Corporation<br>London, England |

[54] LASER CUTTING APPARATUS
11 Claims, 3 Drawing Figs.

[52] U.S. Cl. ............................................................. 219/121
[51] Int. Cl. ......................................................... B23k 27/00
[50] Field of Search.............................................. 219/121,
121 (Laser), 121 (EB), 69, 137, 68; 331/94.5

[56] References Cited
UNITED STATES PATENTS

| 3,265,855 | 8/1966 | Norton .......................... | 219/121 |
|---|---|---|---|
| 3,303,319 | 2/1967 | Steigerwald.................. | 219/121 |
| 3,360,398 | 12/1967 | Garibotti........................ | 219/121 |
| 3,387,109 | 6/1968 | Bruma et al. ................. | 219/121 |
| 3,417,222 | 12/1968 | Cannon et al................. | 219/121 |
| 3,440,388 | 4/1969 | Otstot et al. .................. | 219/121 |
| 2,821,615 | 1/1958 | Fannon ......................... | 219/69 |
| 2,908,798 | 10/1959 | Cresswell et al. ............. | 219/69 |
| 3,009,050 | 11/1961 | Steigerwald.................. | 219/121EBUX |
| 3,388,314 | 6/1968 | Gould............................ | 219/68X |

Primary Examiner—A. Bartis
Assistant Examiner—R. O'Neill
Attorney—Kemon, Palmer & Estabrook

ABSTRACT: A workpiece is cut or gouged by moving a concentrated laser beam along its surface and directing on to the moving region of the workpiece, at which the laser beam is concentrated, a jet of gas; a material which is different from the material of the workpiece is also introduced in this region. The additional material assists the cutting or gouging in that it has a fluxing action with the material of the workpiece and/or an exothermic reaction with the gas.

LASER CUTTING APPARATUS

In the copending Application No. 712,782 filed Mar. 13, 1968 there is described a process of cutting or gouging in which a laser beam is concentrated on a workpiece and relative movement takes place between the beam and workpiece and in which a jet of a gas which produces an exothermic reaction with the workpiece is directed on to the region of the latter at which the laser beam is concentrated to provoke the exothermic reaction and to sweep away the products of combustion. The use of the gas with the laser produces an increase in the rate of cutting and, surprisingly, the accuracy and fineness of the cut are substantially unimpaired in spite of the fact that the cross-sectional area of the gas stream at the workpiece may differ by an order of magnitude from that of the laser beam. It seems that the width of the cut is determined largely by the laser beam and not by the gas jet, although the gas jet controlled the width of cut in earlier processes of thermal cutting and gouging which utilized an exothermic reaction. As explained in the earlier specification, we believe that this was due to the fact that the proportion of the heat input due to the laser and the exothermic reaction which is consumed as latent heat in melting and vaporizing and thus is removed from the body of the workpiece by the gas stream is much more significant than in the case of the earlier processes of thermal cutting.

The present invention is concerned with the cutting or gouging of materials which do not react exothermically with a gas; examples of such materials are ceramic material, brick, tile, concrete stone, rock and glass. According to the present invention, to increase the cutting capability of a laser with such materials, we introduce at the point at which the laser beam is concentrated on the workpiece a material which reacts exothermically with the gas or has a fluxing action with the material of the workpiece; the gas jet then sweeps away the fused material or the fluid products of the fluxing reaction. As an example, the fluxing agent or exothermically reacting metal may be fed as a wire to the point of the workpiece at which the laser beam is directed by any of the conventional mechanisms for feeding filler wire to a weld. In another form, the fluxing agent or exothermically reacting metal is coated on to the surface of the material to be cut, for example by painting. The object of the fluxing agent is to react with the workpiece to form a product of high fluidity, generally a product of low melting point, which can then be displaced by the gas jet. The fluxing agent may be inert; as an example, sodium chloride can be used when the workpiece includes silica or alumina; the gas jet may then be an inert gas or even air as its function is simply to erode and displace the fluxed workpiece rather than to create an exothermic reaction. The additional material introduced at the heated point on the workpiece may have both an exothermic reaction with the gas and a fluxing reaction with the workpiece.

With most of the materials mentioned above, iron may be used as an exothermically reacting metal with an oxygen jet. With materials containing silica or alumina, an iron wire or strip fed to the point at which the laser beam impinges on the workpiece rapidly oxidizes and provides superheated iron oxide which forms a low melting-point mixture with silica and alumina. In a similar way, iron may be used as a fluxing agent with an oxygen jet for aluminum, which also forms refractory oxides when heated. Gaseous fluxing agents such as methyl borate and boron trifluoride, for example, can also be used.

In order that he invention may be better understood, two examples of apparatus for carrying the invention into effect will now be described with reference to the accompanying drawings, in which.

Figure 1:
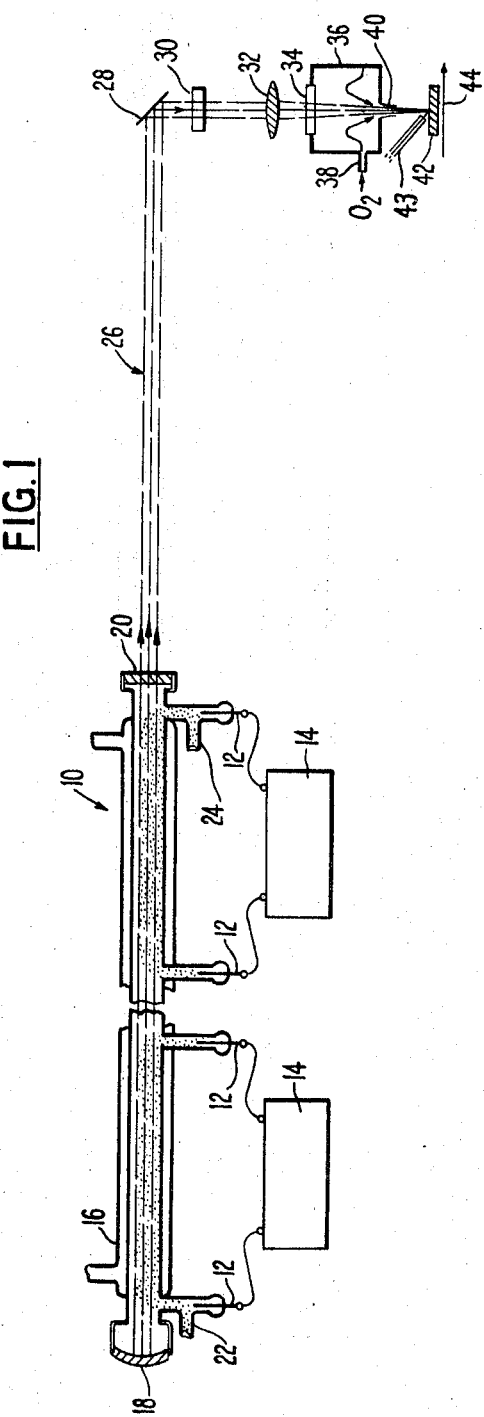
FIG. 1 shows diagrammatically the arrangement of the parts in the apparatus of this example.

In FIG. 1, the laser 10 is of the carbon dioxide-nitrogen-helium type and has a length of 10 meters and a bore of 30 mm. There are five sections to the tube, only two being shown in the diagram, and each section has its own electrodes 12 and its own electrical supply 14. The power supply provides 20 kv. for striking and 9 kv. at 45 ma. when the laser is running. The laser body 16 has a fully reflecting concave mirror of gold-surfaced stainless steel at one end and a plain semireflecting germanium disc 20 at the other end. The concave mirror has a focal length slightly in excess of 10 m. The gas in which the discharge is to be created flows into the laser body through the inlet 22 and out from the laser body through the outlet 24.

It should be understood that the design and operation of the laser form no part of the present invention and it will be sufficient to state that when the laser is in operation a substantially parallel beam of coherent light emerges from the laser through the disc 20. The emergent beam 26 is reflected by an aluminized mirror 28 through a safety shutter 30 to a focusing lens 32. From this lens, the beam passes through a window 34 into an oxygen chamber 36. Oxygen enters this chamber through an inlet 38 and emerges travelling towards the workpiece through a nozzle 40. The axis of the laser beam passes centrally through the nozzle 40 and the beam is brought to a focus by the lens 32 at or close to the surface of the workpiece 42. A wire of a suitable exothermically reacting or fluxing material is directed on to the workpiece at the point at which the laser beam strikes the latter. As indicated by the arrow 44, the workpiece is moved horizontally to permit the laser, assisted by the oxygen stream and the wire 43, to make a cut. The wire 43 continues to be directed towards the intersection of the laser beam with the workpiece surface and is fed forward continuously in its holder to replace the material of its leading end which has been melted or vaporized by the laser. As the cut proceeds, the molten or vaporized material from the workpiece and wire is ejected through the cut zone by the oxygen jet.

Figure 2:
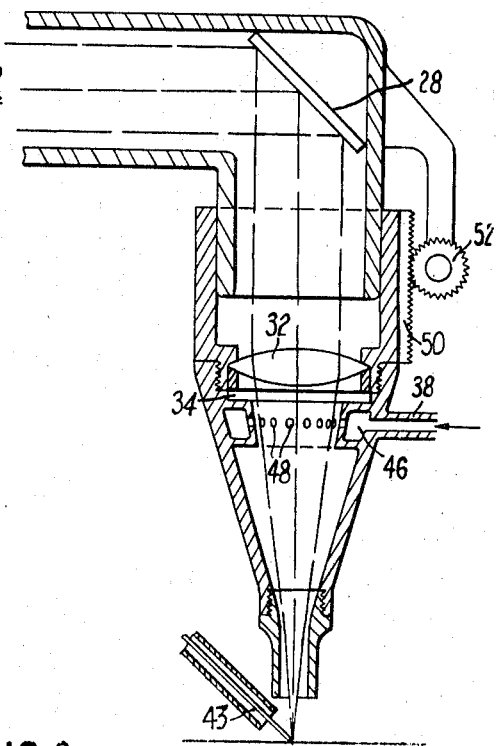
FIG. 2 shows in section the nozzle of the apparatus shown in FIG. 1.

FIG. 2 shows a nozzle suitable for use in the apparatus of FIG. 1, the safety shutter being omitted for clarity. The reflector 28 turns the beam 26 through a right-angle and directs it through the lens 32 and the window 34 into a tapering nozzle. This nozzle contains an oxygen inlet 38 leading to an annular diffusing ring 46 in the nozzle wall, from which the oxygen enters the nozzle chamber through a series of holes 48. The oxygen is prevented from flowing upwards by the window 34 and emerges from the outlet at the lower end of the nozzle to impinge upon the workpiece 42. The rack 50 and pinion 52 are provided to permit adjustment of the cutting head.

In drawings, the laser beam and gas jet have been shown as striking the workpiece perpendicularly to its surface. However, the nozzle through which the beam and jet emerge can instead be arranged at an angle to the workpiece surface. This is required, for example, when a gouging operation is to be carried out. The gas jet then blows the molten material ahead of it, forming a groove in the workpiece.

Figure 3:
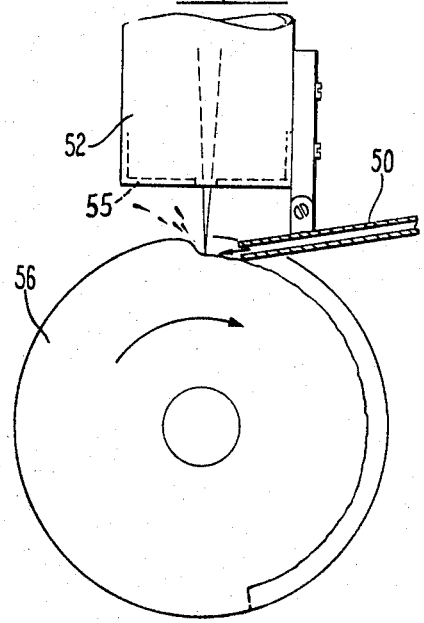
FIG. 3 shows the nozzle of an alternative apparatus.

FIG. 3 illustrates the use of the invention in a "parting" operation to form a groove in a rotating workpiece 56 of circular cross section. The groove may be continued until the workpiece is cut through. The nozzle 50 through which a gas stream is directed at the workpiece is distinct from the tube 52 through which the laser beam emerges and is set at an angle to the beam axis. The gas flowing along the nozzle 50 carries a powdered material which reacts exothermically with the gas, when heated, or has a fluxing action on the workpiece. A diaphragm 55 prevents the reflection of excessive light energy from the workpiece back into the laser.

The apparatus shown in FIG. 3 can also be used for the delivery of a gaseous fluxing agent. A carrier gas with which the gaseous fluxing agent is mixed is directed along the nozzle 50 towards the workpiece.

As explained above, it is not necessary to use oxygen when an exothermic reaction is not being utilized Thus, for cutting ceramic materials air, nitrogen, argon or any other inert gas can be used with a fluxing agent to produce erosion.

Chlorine can be used for cutting fused alumina and copper.

I claim:

1. A method of cutting or gouging in which a laser beam is concentrated at a point on a workpiece and the beam and workpiece are moved relatively to one another so that the said point moves along the workpiece and in which a jet of gas is directed at the point on the workpiece at which the laser beam is concentrated, and a material which is different from, and has a fluxing action with, the material of the workpiece and which reacts exothermically with the gas is introduced into the gas jet at the said point on the workpiece.

2. A method in accordance with claim 1, in which the said material is iron and the workpiece is of such composition as to be fluxed by said iron.

3. A method in accordance with claim 2, in which the said material is iron wire or strip which is fed forwards continuously towards the point on the workpiece at which the laser beam strikes the workpiece.

4. A method in accordance with claim 1, in which the workpiece is aluminum.

5. A method of cutting or gouging in which a laser beam is concentrated at a point on a workpiece and the beam and workpiece are moved relatively to one another so that the said point moves along the workpiece, and in which a jet of gas is directed at the point on the workpiece at which the laser beam is concentrated and in which a material which has a fluxing action with the material of the workpiece is so guided that it first meets the beam and workpiece at the said point on the workpiece at which the beam is concentrated.

6. A method in accordance with claim 5, in which the fluxing material is sodium chloride and the gas is an inert gas.

7. A method in accordance with claim 5, in which the fluxing material is of gaseous form.

8. A method in accordance with claim 5, in which the fluxing material is sodium chloride and the gas is air.

9. Apparatus for cutting or gouging a workpiece, comprising: a laser; means for concentrating the beam of the laser onto the surface of a workpiece; a source of gas; a nozzle connected to the gas source for directing a jet of gas toward the point on the workpiece at which the laser beam is concentrated; and means for directing at the said point of concentration a material which has a fluxing action with the material of the workpiece.

10. Apparatus in accordance with claim 9, in which the nozzle for directing the gas jet towards the said point is coaxial with the axis of the laser beam and the means for directing the said material towards the said point is a second nozzle making an angle with the said first nozzle.

11. Apparatus in accordance with claim 9, in which the nozzle for directing the gas towards the point on the workpiece at which the laser beam is concentrated makes an angle with the direction of the laser beam and in which the same nozzle serves for the passage of the said material towards the point of concentration of the laser beam.

UNITED STATES PATENT OFFICE
CERTIFICATE OF CORRECTION

Patent No. 3,569,660　　　　　　　　　Dated March 9, 1971

Inventor(s) Peter T. Houldcroft

It is certified that error appears in the above-identified patent and that said Letters Patent are hereby corrected as shown below:

[32]　Priority　　Aug. 1, 1967
[33]　　　　　　　Great Britain
[31]　　　　　　　35,344/67

Signed and sealed this 13th day of June 1972.

(SEAL)
Attest:

EDWARD M. FLETCHER, JR.　　　　　　ROBERT GOTTSCHALK
Attesting Officer　　　　　　　　　　Commissioner of Patents